United States Patent

Staelin

[11] Patent Number: 5,835,777
[45] Date of Patent: Nov. 10, 1998

[54] METHOD OF AUTOMATICALLY GENERATING A SOFTWARE INSTALLATION PACKAGE

[75] Inventor: Carl Staelin, Palo Alto, Calif.

[73] Assignee: Hewlett-Packard Company, Palo Alto, Calif.

[21] Appl. No.: 619,876

[22] Filed: Mar. 20, 1996

[51] Int. Cl.$^6$ ...................................................... G06F 9/445
[52] U.S. Cl. ............................................................ 395/712
[58] Field of Search .................................... 395/712, 703, 395/701, 702, 710; 364/975.1

[56] References Cited

U.S. PATENT DOCUMENTS

| | | | |
|---|---|---|---|
| 5,247,683 | 9/1993 | Holmes et al. | 395/700 |
| 5,361,360 | 11/1994 | Ishigami et al. | 395/700 |
| 5,367,686 | 11/1994 | Fisher et al. | 395/700 |
| 5,421,009 | 5/1995 | Platt | 395/600 |
| 5,473,772 | 12/1995 | Halliwell et al. | 395/650 |
| 5,493,682 | 2/1996 | Tyra et al. | 395/700 |
| 5,555,416 | 9/1996 | Owens et al. | 395/700 |
| 5,634,114 | 5/1997 | Shipley | 395/500 |

Primary Examiner—James P. Trammell
Assistant Examiner—Kakali Chaki

[57] ABSTRACT

A method of automatically generating a software installation package. The method operates on an application program that has been ported to and debugged on a target computer system. A manifest is automatically generated, listing all application program files that must be installed on the target computer system. Then the method automatically determines which resources, in particular shared libraries, are needed by any of the listed files. Then the installation package is generated by combining the listed files, the needed resources, and any related installation materials. The needed resources are determined by generating a dependency list, comparing it with existing software installation packages, and identifying any packages that contain needed shared libraries as needed resources.

8 Claims, 3 Drawing Sheets

METHOD OF AUTOMATICALLY GENERATING A SOFTWARE INSTALLATION PACKAGE

BACKGROUND OF THE INVENTION

The present invention relates generally to computer systems and more particularly to a method of automatically generating a software installation package that can be used to install an application program in a user's computer system.

There has been a continuing need for a simple and easy way to install an application program in a user's computer system. At one time this was done manually. The user would obtain an application program, typically on diskettes or other magnetic media, and would manually copy the application files from the magnetic media into one or more directories in the user's computer system. After this was done, the user would manually configure the application. As applications acquired more capabilities and grew correspondingly more complex, this installation process became a time-consuming and error-prone ordeal that often ended in an inoperative system and extreme frustration on the part of the user.

Software publishers have devoted much effort to finding a way to make it easier for users to install application programs. These efforts have led to the development of installation packages that take over the installation process from the user. Such installation packages have been perfected to the point that now they can install an application program almost completely automatically, ensuring that the application will work as desired and relieving the user of this burdensome chore.

Creating an installation package that can reliably install an application program is not a trivial task. The installation package must include all the files of the application program, and these files must be properly configured for the target computer system. In addition, the installation package includes other materials such as data files, scripts, executable programs, or the like. These materials operate more or less automatically to carry out the installation of the application program files. Depending on the operating system and on other characteristics of the computer system in which the application is to be installed, creating a new installation package generally requires creating some or all of such materials anew, and this in turn may involve such tasks as writing a new program or creating a complicated data file. The burden of creating these materials falls on the software engineer, who must devote many hours of meticulous effort to this task.

Software tools that can create portions of installation packages are known. However, such tools do not relieve the software engineer of the considerable effort of creating the complete package. For example, one such tool requires the software engineer to manually create an arcane and complicated configuration file specifying many of the details of the installation.

A mass-marketed application program may sell hundreds of thousands of copies and thereby generate sufficient revenue to justify the extensive effort required to produce a good installation package. But many applications, especially those created for use by engineers and others who use computer workstations in environments such as the UNIX® operating system are distributed singly or in only a few copies (UNIX is a registered trademark in the United States and other countries licensed exclusively through X/Open Company, Ltd.). It has not been economically justifiable to spend the time necessary to develop good installation packages for such applications. The result has been either that effort is expended out of all proportion to the value of the application, or that the installation package does not get developed at all, or that an inadequate package is prepared. None of these outcomes is satisfactory.

One part of developing an installation procedure for a new application is determining which files to install and where in a target computer system to install them. A script has been developed that attempts to do this by (1) saving a list of all files in the system prior to installation of the new application, (2) saving preselected configuration files prior to installation, (3) installing the new application, (4) saving a list of all files in the system after the installation, (5) saving the preselected configuration files after installation, and (6) comparing to make a list of added files and any configuration changes. This script does not account for any files that are modified during installation (except the preselected configuration files). Thus, although the script performs one step in the process of creating an installation package, most of the work must still be done manually by the software engineer.

From the foregoing it will be apparent that there is a need for a way to create an installation package for a new computer application without the expenditure of large amounts of software engineering effort.

SUMMARY OF THE INVENTION

The present invention provides a method of automatically creating a new software installation package that can correctly install an application program on a target computer system. Using the method of the invention, a software engineer can easily and quickly create the installation package even for an application that consists of thousands of separate files.

Briefly and in general terms, the method of the invention begins with a new application program. The application program may have been created by the same engineer who wishes to use the method of the invention to create an installation package, or it may have been created by others. Once the application has been ported to the target computer system and debugged so that it is operable on the target system, the invention is used to generate the installation package. This includes the steps of automatically generating a manifest that lists all application program files which need to be installed on the target system, automatically determining which resources are needed by those files, providing needed installation materials, and generating the installation package by combining the listed files, any needed resources and the installation materials.

The step of determining which resources are needed preferably includes several substeps. The first substep is automatically generating a dependency list of any shared libraries referenced by any of the listed application program files. The next substep is automatically determining which of these shared libraries is already present in a preexisting software installation package. Finally, if any shared libraries are included in one or more preexisting software installation packages, then such preexisting packages are identified as needed resources.

Optionally, a cross-reference to any listed shared library that is not included in any of said preexisting installation packages is also included in the software installation program.

In one embodiment the installation materials include a routine that automatically causes each preexisting software installation package identified as a needed resource to be installed along with the new software installation package on the target computer. This may be done selectively, for example the preexisting package may only be installed if an application which that preexisting software installation package installs has not already been installed on the target system.

The new software installation package is typically distributed by recording on magnetic media, such as tape or diskettes. The media can then be reproduced and distributed to users as desired. Alternatively, the package may be stored in a central location such as the hard disk of a network server so that the application program can be installed on any other computer having access thereto.

The step of generating the manifest preferably includes saving a new timestamp, installing the application program in a testbed computer, and generating a list of all files in the testbed computer system having a timestamp more recent than the saved timestamp. This will ensure that all necessary files are identified. In one embodiment any file of a kind that has been previously determined to be spurious is excluded. The software engineer may review the list to delete any other spurious files that may have crept in. In another embodiment only files in certain preselected directory trees are considered.

Other aspects and advantages of the invention will become apparent from the following detailed description, taken in conjunction with the accompanying drawings, illustrating by way of example the principles of the invention.

DESCRIPTION OF THE PREFERRED EMBODIMENT

Figure 1:
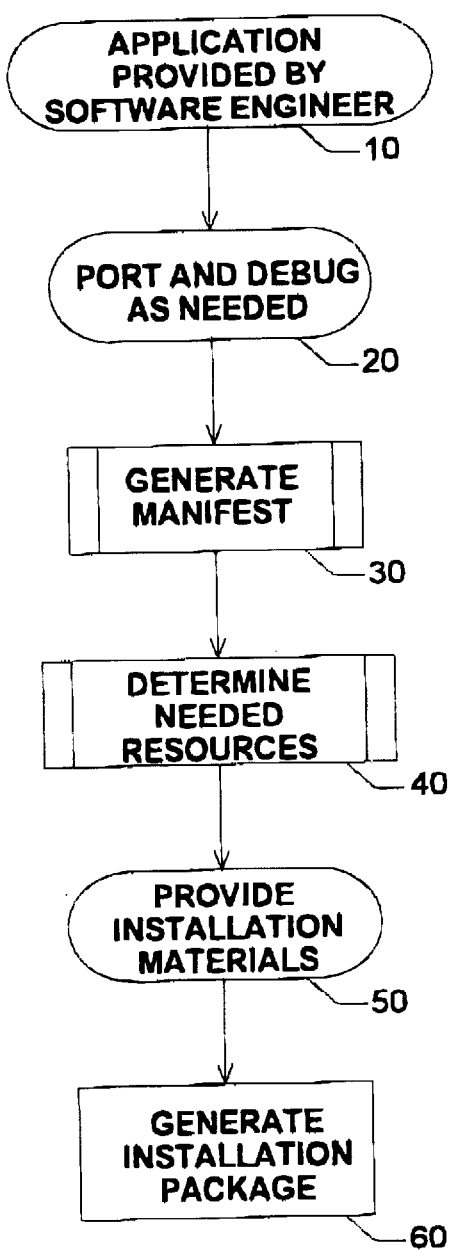
FIG. 1 is a flowchart depicting in general outline the method of the invention.

As shown in the drawings for purposes of illustration, the invention provides a method of automatically creating a new software installation package that is used to install an application program in a target computer. Software engineers have had to create such installation packages manually, a procedure that has required increasingly large amounts of effort as application programs have grown larger and more complex.

In accordance with the invention, when a new application program has been ported to a target computer system and debugged, the method of the invention automatically generates a manifest and a list of required shared libraries. Using this information, an installation package is assembled. This method enables the software engineer to quickly and easily create an installation package that correctly installs even a very large and complex application program.

A method of automatically generating a software installation package for installing an application program on a target computer system according to the principles of the invention is depicted in flowchart form in FIG. 1. Initially the new application is provided, for example by a software engineer or by a team of such engineers (block 10) and is ported and debugged so that it is operable on the target system (block 20).This has been satisfactorily done if the software is in such condition that the application program can be automatically installed on the testbed computer. For example, in a computer system that uses the HP-UX operating system version 9.0, distributed by Hewlett-Packard Company, often the application is in satisfactory condition when the "MAKE CLEAN", "MAKE", and "MAKE INSTALL" commands build and install the application properly.

Starting with software that has been ported and debugged, the first step of the invention is to automatically generate a manifest that lists all files which must be installed on the target computer system in order for the application program to function correctly (block 30). The next step is to automatically determine which resources referenced by any of the listed files are needed on the target computer system in order for the application program to function correctly (block 40). Then needed installation materials are provided (block 50). The last step is to generate an installation package by combining the listed application program files, any needed resources, and the installation materials (block 60).

The step of generating the installation package typically includes recording the listed files and other subject matter on magnetic media, such as tape or floppy diskettes, for distribution to a user of the target computer system. These files and other subject matter may also be placed in an accessible location on a computer system, for example the hard disk of a network server, that is in electrical communication with the target computer system. The target system can run the installation package directly from the server or it can download the installation package and then run the installation program locally.

Figure 2:
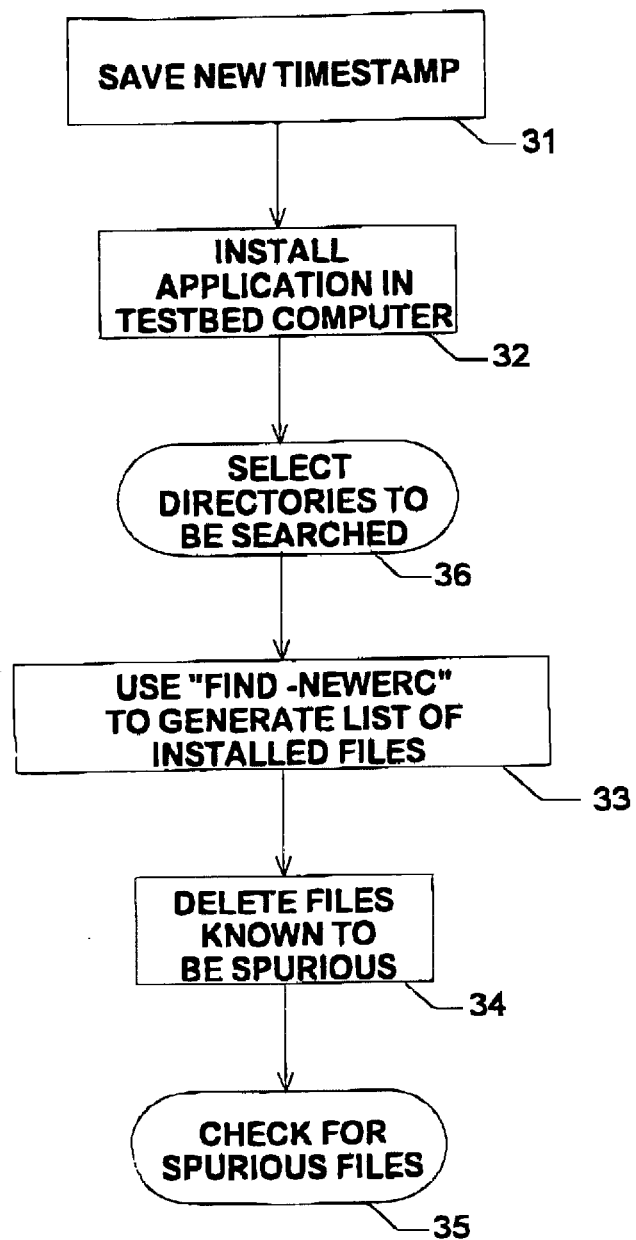
FIG. 2 is a flowchart depicting more details of a preferred embodiment of the "generate manifest" block of FIG. 1.

FIG. 2 illustrates an example of how to generate the manifest. A new timestamp is generated and saved (block 31). Then the application program is installed in a testbed computer system (block 32). In the HP-UX 9.0 environment this may often be done by using the "MAKE" and "MAKE INSTALL" commands. Typically the testbed is a system similar to the target systems on which the installation package will later be run. Then all files in the testbed computer system having a timestamp more recent than the saved timestamp are listed (block 33). In the HP-UX 9.0 environment this may be done by using the "-NEWERC" option with the "FIND" command.

Depending on the operating system, it may be necessary to attach the new timestamp to each of the application program files prior to installing the application on the testbed computer. In the HP-UX 9.0 environment this is not necessary because the files will automatically receive new timestamps when they are copied during the installation process.

In one embodiment the file list is filtered to remove any file of a kind which has been predetermined as indicative of a spurious file (block 34). This may be done, for example, by searching for all files having a certain name or a certain character string in their name. Such files may have been generated or modified by system daemons. Such filtering can be done during the generation of the list, such that the unwanted files are never added to the list, or afterwards by deleting the unwanted files from the list. Optionally, the software engineer then manually reviews the file list to remove any other unwanted files (block 35).

In another embodiment, only files in predetermined directory trees are checked and, if their timestamps are newer than the saved timestamp, are placed on the list (block 36). This can shorten the time required to prepare the list if the software engineer knows ahead of time which directories need not be checked, for example because it is known that no new program files will be inserted in such directories.

Figure 3:
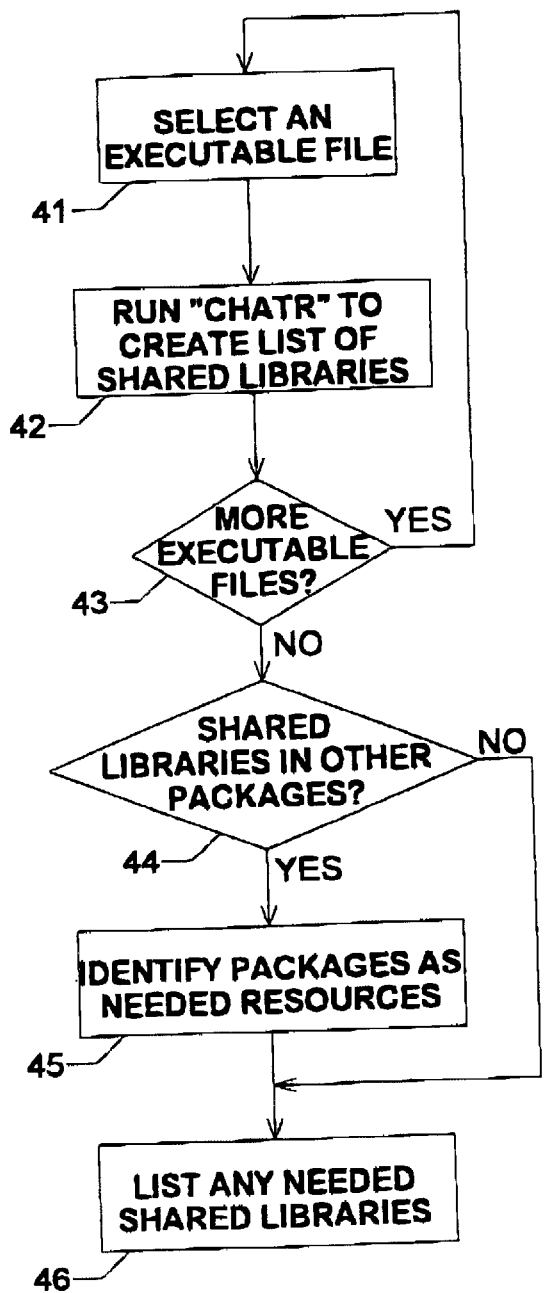
FIG. 3 is a flowchart depicting more details of a preferred embodiment of the "determine needed resources" block of FIG. 1.

The step of determining which resources are needed preferably comprises automatically generating a dependency list that lists any shared libraries referenced by any of the listed object files, automatically determining which of the listed shared libraries are already included in one or more preexisting software installation packages, and identifying each such preexisting software installation package as a needed resource. An example of how these steps preferably are carried out is given in FIG. 3. An executable file is selected from the manifest (block 41). This file is then examined to determine which shared libraries it uses and a list of these libraries is prepared (block 42). In the HP-UX 9.0 environment this is conveniently done by means of the "CHATR" command. If there are more executable files the procedure is repeated, once for each executable file, and any shared libraries are added to the list (block 43).

The list of shared library dependencies is compared with those libraries already present in preexisting software installation packages (block 44). A list of any needed preexisting software installation packages results from this comparison (block 45) and is used in generating the new software installation package.

In one embodiment the new software installation package also includes a cross-reference to any shared libraries which are needed by the new package but which have not been found in any preexisting software installation packages (block 46).

The installation materials include any routines or programs needed to automatically install the application on the target computer. For example, the materials normally include a routine that copies all the application program files into the appropriate directories or directory trees on the target computer.

In one embodiment the installation materials include a routine that automatically causes any preexisting software packages that have been identified as needed resources to be installed on the target computer system, thereby assuring that all needed shared libraries will be present on the target computer system after the new software installation package has been installed. This routine may perform such installation selectively, installing only those preexisting packages that have not previously been installed on the target computer.

The method of the invention is carried out automatically by computer. The software which carries out the steps of the invention may be recorded on magnetic media, or stored in computer memory, or otherwise made available for use by software engineers in creating installation programs.

From the foregoing it will be appreciated that the method of the invention provides a fast and easy way for a software engineer to create an installation program and thereby generate an installation package for an application program. The invention eliminates both the considerable effort and the frequent errors that resulted from attempts to create an installation program manually. Once created, the installation package may be used by computer system users to install the application program on their computer systems.

Although a specific embodiment of the invention has been described and illustrated, the invention is not to be limited to the specific forms or arrangements of parts so described and illustrated. The invention is limited only by the claims.

I claim:

1. A method of automatically generating a new software installation package for installing an application program on a target computer system, the application having been ported to the target system and debugged so that it is operable thereon, the method comprising:
    (a) automatically generating a manifest that lists all files of the application program which must be installed on the target computer system in order for the application program to fiction correctly;
    (b) automatically determining which resources needed by any of the listed files must be installed on the target computer system in order for the application program to function correctly including:
        automatically generating a dependency list that lists any shared libraries needed by any of the listed files but not included in the application program,
        automatically determining which of the listed shared libraries are already included in one or more preexisting software installation packages, and
        automatically identifying said preexisting software installation packages as needed resources;
    (c) providing installation materials for installing the application program files on the target computer system; and
    (d) generating the new software installation package by associating the listed application program files, any resources determined to be needed by the application program files, and the installation materials.

2. A method as in claim 1 wherein step (d) comprises including in the new software installation package a cross-reference to any listed shared library that is not included in any of said preexisting installation packages.

3. A method as in claim 1 wherein step (d) comprises including in the installation materials a routine that automatically causes each identified preexisting software installation package to run on the target computer if an application which the preexisting software installation package installs has not already been installed thereon.

4. A method as in claim 1 and further comprising, after step (d), the step of placing the listed application program files and the installation materials in an accessible location on a computer system that is in electrical communication with the target computer system.

5. A method as in claim 1 and further comprising, after step (d), the step of recording the new software installation package on magnetic media for distribution to a user of the target computer system.

6. A method of automatically generating a new software installation package for installing an application program on a target computer system, the application having been ported to the target system and debugged so that it is operable thereon, the method comprising:
    (a) automatically generating a manifest that lists all files of the application program which must be installed on the target computer system in order for the application program to function correctly, including:
        (1) saving a new timestamp,
        (2) installing the application program in a testbed computer system, and
        (3) generating a list of files in the testbed computer system having a timestamp more recent than the saved timestamp;
    (b) automatically determining which resources needed by any of the listed files must be installed on the target computer system in order for the application program to function correctly;
    (c) providing installation materials for installing the application program files on the target computer system; and
    (d) generating the new software installation package by associating the listed application program files, any resources determined to be needed by the application program files, and the installation materials.

7. A method as in claim 6 wherein substep (3) of step (a) comprises:

generating a list of all files, except any file of a kind which has been predetermined as indicative of a spurious file, in the testbed computer system having a timestamp more recent than the saved timestamp.

8. A method as in claim 6 wherein substep (3) of step (a) comprises:

generating a list of all files in a predetermined directory tree of the testbed computer system having a timestamp more recent than the saved timestamp.

* * * * *